United States Patent [19]

Szanto

[11] Patent Number: 5,249,246
[45] Date of Patent: Sep. 28, 1993

[54] SELF-CONTAINED FIBER SPLICING UNIT AND METHOD FOR SPLICING TOGETHER OPTICAL FIBERS

[76] Inventor: Attila J. Szanto, P.O. Box 6443, Station "J", Ottawa, Ontario, K2A 3Y6, Canada

[21] Appl. No.: 905,324

[22] Filed: Jun. 29, 1992

[51] Int. Cl.$^5$ .................. G02B 6/36; C03B 23/20; B23K 3/00
[52] U.S. Cl. .................. 385/96; 385/95; 385/97; 385/98; 385/99; 65/4.1; 65/4.2; 65/12; 219/85.16; 219/85.22
[58] Field of Search .................. 385/95, 96, 97, 98, 385/99, 68; 65/4.1, 4.2, 12; 219/121.11, 121.13, 121.14, 85.16, 85.22

[56] References Cited

U.S. PATENT DOCUMENTS

| | | | |
|---|---|---|---|
| 4,049,414 | 9/1977 | Smith | 385/96 X |
| 4,533,234 | 10/1985 | DeVeau, Jr. et al. | 385/98 |
| 4,598,974 | 7/1986 | Munn et al. | 385/96 X |
| 4,807,959 | 2/1989 | Berkey | 385/99 |
| 4,810,054 | 3/1989 | Shinbori et al. | 385/96 X |
| 4,957,343 | 9/1990 | Sato et al. | 385/96 X |
| 4,971,418 | 11/1990 | Dorsey et al. | 385/96 X |
| 5,002,351 | 3/1991 | Szanto et al. | 385/96 X |
| 5,076,657 | 12/1991 | Toya et al. | 385/96 X |
| 5,146,527 | 9/1992 | Mallinson | 385/96 |
| 5,157,751 | 10/1992 | Maas et al. | 385/99 |
| 5,183,489 | 2/1993 | Bremhm et al. | 385/98 X |

*Primary Examiner*—Brian Healy
*Attorney, Agent, or Firm*—Burke-Robertson

[57] ABSTRACT

A self-contained unit and method for splicing together the ends of jacketed optical fibers. The unit comprises a guide to align fibers, such as a capillary tube, having opposite ends into which the ends of optical fibers to be spliced pass until they are in contact in a central portion of the guide. A heater high temperature proximal to the central portion of the guide, when activated, generates sufficient heat to fuse and splice together the contacting fiber ends. A securing means, such as spaced ferrules with a tube of ceramic material joining the ferrules, is mechanically associated with the guide to mechanically hold in position the optical fibers when spliced together. By bringing the ends of jacketed optical fibers into contact within the guide, in the vicinity of heater, and subjecting the ends to high temperature heating, the fibers are fused and spliced at their ends.

18 Claims, 1 Drawing Sheet

SELF-CONTAINED FIBER SPLICING UNIT AND METHOD FOR SPLICING TOGETHER OPTICAL FIBERS

FIELD OF THE INVENTION

The present invention relates to a new device for the connection of fibers by using a ferrule with integrated filaments and an associated tool to do so.

BACKGROUND OF THE INVENTION

Optical fibers are widely used in various communications systems. They offer an alternative to copper wires as a transmission medium, providing numerous advantages over copper technology. These advantages are as follows:

(a) very low signal loss
(b) extremely wide bandwidth
(c) no electromagnetic emission
(d) not susceptible to interference
(e) small physical size
(f) low weight.

Because of the minute physical dimensions of the fibers (for example they may have an outer diameter of 5/1000"), two fibers which are to be spliced must be aligned very accurately so that their cores (the central, light conducting portions) are concentric.

Several techniques for joining fibers have been developed, two of which are widely used currently.

One of these, fusion splicing, relies of melting the fibers which are to be joined, until the two fibers flow into one another. Core joins to core and jacket (or cladding) to jacket.

This is accomplished by aligning the two fibers with high precision V grooves. bringing the cut ends of the fibers together until they touch, and surrounding the cut with an electric arc generated by a high voltage power supply. The arc generates very high temperatures, melting the fibers together.

Advantages of fusion splicing include the facts that the fibers essentially become integral with one another and hence the index of refraction, even where the fibers are joined, is homogeneous, eliminating back reflection of light. As well, due to the integral nature of a fusion spliced fibre, temperature changes or vibration do not affect the splice. Long term performance of fusion splices is now well established and they are known to be very reliable.

On the other hand, several disadvantages are inherent with fusion splicing. These include:

1. Following fusion splicing, the fiber is very brittle—thus it must be protected.
2. The fiber is susceptible to breakage between the time it is fused together and the time a protective splint (splice pack) is applied to it.
3. The fusion splicing machine is a complicated, high precision, delicate instrument, which is very expensive.
4. The quality of the fusion is dependent on factors such as electrode spacing, electrode shape, electrode cleanliness etc. These factors are influenced by maintenance and equipment care.
5. The quality of the fusion splice is also influenced by the mechanical aspects of the splicing machine, such as the V-groove cleanliness, condition of the V-groove etc.
6. Splice quality is also influenced by environmental conditions such as temperature, altitude and humidity, due to their effect on the fusion arc.

A second common technique for joining fibers is called "mechanical splicing". Mechanical splicing works on the principle of bringing the cut ends of the fibers together by some precision alignment tube, and holding them in that position by some mechanical means.

Several types of mechanical splices are on the market today, with names such as elastomeric splice, rotary splice, FIBRLOK* etc.

*=trade-mark

The elastomeric splice consists of a glass tube (capillary) into which a hollow elastic tube is pressed. The inside diameter of the tube is smaller than the diameter of the fibre, so that as the fiber is pushed into the hole, the force of the elastic material tends to center the fibers. Alignment of the fibers which are to be joined is thus achieved.

The elastic tube also has some optically transparent, viscous material injected into it, whose index of refraction is close to that of the optical fibers, thus reducing light reflection at the junction.

An overall mechanical splint is used around the splice, in order to keep the fibers from pulling apart.

The rotary splice can almost be described as an optical connector, in which each of the two fibers to be joined is glued into a ferrule. The ferrule ends are then polished and then the two are brought together in an alignment sleeve.

An overall mechanical housing holds the two ends together under spring tension.

The Fibrlok* splice is essentially similar to the others, except that the two fibers are surrounded by soft metal sleeves which are deformed by a tool. The deformed material exerts pressure on to the fibers, preventing them from moving.

* trade-mark

Advantages of mechanical splicing include the fact that the equipment required to install the splices is simple, the splice process is not affected by environmental conditions, no significant maintenance is required for the equipment, capital investment is low, there is a relatively low level of operator training required and equipment is small, allowing the user to perform splicing in cramped areas.

Disadvantages of mechanical splicing however are significant. Firstly, since the fibers are not physically joined into a single piece, vibration, long term creepage or material degradation may eventually degrade splice quality. Secondly, due the space between the two fiber ends (regardless how small that space is), reflection of light will occur, degrading performance.

Mechanical splicing systems are described in U.S. Pat. Nos. 4,820,007 of Ross et al, 4,892,381 of Glasheen and 5,011,825 of Takeda. An apparatus for fusing together optical fibers is described and illustrated in Thorncraft et al U.S. Pat. No. 5,011,252.

U.S. Pat. No. 3,810,802 of Buhite et al describes and illustrates and optical fiber splicing device and technique in which fibers are aligned collinearly in a hollow sleeve with a quantity of low melting point transparent thermoplastic glue being inserted in the sleeve at the junction of the two fibers. Heat is applied to melt the thermoplastic causing it to flow around the aligned ends, thereby producing an optically efficient bond with removal of the heat source.

SUMMARY OF THE INVENTION

It is an object of the present invention to provide a self-contained unit and technique for splicing together the ends of jacketed optical fibers which produces a fusion of the fibers. It is a further object of the present invention to provide a device which acts as a mechanical splice which fuses the fibers and simultaneously locks together the jackets of the fibers in position, thus providing a rugged, finished splice. It is a further object of the present invention to provide a device and technique which permits the splicing together of optical fibers in very tight spaces.

The invention accordingly provides a self-contained unit for splicing together the ends of jacketed optical fibers comprising a guide means such as a capillary tube having opposite ends into which the ends of optical fibers to be spliced pass until they are in contact in a central portion of the guide means. A high temperatural heater means is proximal to the central portion of the guide means. When activated the heater means generates sufficient heat to fuse and splice together the contacting fiber ends. The unit further comprises securing means mechanically associated with the guide means to secure optical fibers when spliced together.

In a preferred embodiment of the present invention, spaced ferrules are located at the ends of the capillary tube and rigid means extend between the ferrules to secure them in spaced relationship. Pockets are preferably provided in opposite ends of the ferrules within which pockets the jackets of the fibers are to be seated and secured. Electrical contact between the electrical heater and the ferrules is preferably provided by means of conducting material deposited on a capillary tube. As well, the means extending between the ferrules to secure them in spaced relationship comprises a tube of ceramic material, to a different end of which each of the ferrules is secured. The means extending between the ferrules to secure them in spaced position with respect to each other is preferably either evacuated, inert gas filled or air filled.

In addition, the present invention relates to a method of splicing together ends of jacketed optical fibers comprising passing the ends to be joined into a capillary tube and into contact in a zone, within the capillary tube subject to high temperature heating. The capillary tube extends between spaced ferrules joined by rigid securing means, with the jackets of the fibers positioned in pockets in the ferrules. The zone is then heated to fuse and splice corresponding ends of the fibers. The invention also relates to method wherein an electrical heating element is positioned proximal to the heating zone and electric current is passed to the heater element to generate heat to fuse the ends of the fibers.

The unit and method according to the present invention addresses many of the shortcomings of the two, previously described, conventional splicing techniques. The technique provides both a mechanical splice and a fusion splice in one and, as previously indicated, does not require the use of an external electric arc for fusion of the fibers. The source of fusion heat is built right into the splice uniy. The unit provides mechanical support to the fiber and overall splice protection in a fused joint. Other specific advantages of the present invention include:

1. The fiber ends are permanently joined, thus there is no light reflection at the joint.
2. With the fiber ends permanently joined, long term splice quality is maintained, since no movement of the splice interface is possible.
3. Activation of the splice with the electrical heating element may require only a low voltage, high current battery. Alternatively self-contained electrodes with a high voltage external power supply may be used. In either case the process is safer and simpler to operate.
4. Fiber alignment is provided automatically. No precision V-grooves which may become damaged, misaligned or contaminated, are required.
5. With the heat source self-contained in the splice unit and isolated from the outside environment, external influences such as altitude, humidity, wind, etc. will have no effect on the splice.
6. The unit is relatively straightforward to manufacture and the installation tool (crimper) is low in cost.
7. The design of the unit makes it unnecessary to apply further splice protection in order to achieve the necessary ruggedness. Thus a very small splice is achievable.
8. The simplicity and small size of the unit allows its used in very tight spaces.
9. The unit lends itself readily to a portable crimper tool which can be used to provide the mechanical/-fused joint on fiber ends.
10. With the fusion environment fully controlled, virtually no adjustment of the crimper will be required.

BRIEF DESCRIPTION OF THE DRAWINGS

These and other objects and advantages of the invention will become apparent upon reading the following detailed description and upon referring to the drawings in which.

Figure 1:
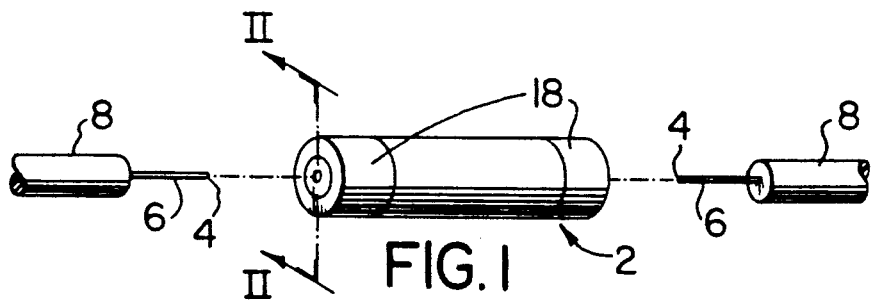
FIG. 1 is a perspective view of stripped, optical fiber ends to be inserted into an example embodiment of self-contained splice unit according to the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Figure 2:
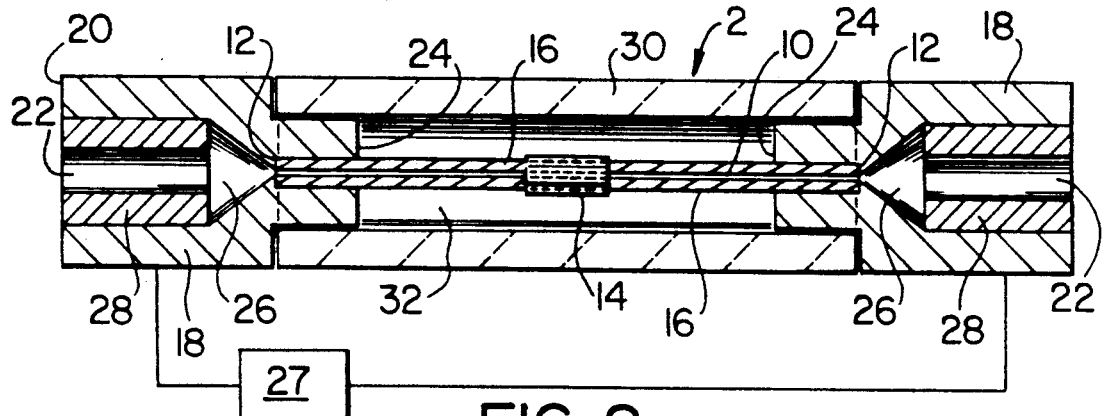
FIG. 2 is a cross-sectional view, through II—II of FIG. 1, of the splice unit.

Turning to FIGS. 1 and 2, there is illustrated a unit 2 for splicing together the ends 4 of optical fibers 6 in accordance with the present invention. The optical fibers are the conventional type having a jacket 8 of, for example, PVC or other plastic material. Splice unit 2 comprises a guide means such as a capillary tube 10 (FIG. 2) having opposite ends 12 through which the ends 4 of the optical fibers pass, as will be described in more detail subsequently, until they are in contact in a central portion of the tube which portion is circumscribed by a heater means 14. (The guide means may alternatively, for example, be a precision V-groove (not illustrated), known to those skilled in the art, having a similar function of aligning fibers.) Heater means 14 is preferably a high temperature element such as a carbon or tungsten heating element which is deposited around the capillary tube 10 preferably at its mid-point. An electrically conducting material 16 is deposited on the exterior surface of capillary tube 10, to the sides of heater 14. Alternatively, the element may be formed from electrodes (not illustrated) capable of generating an electric arc to produce the necessary temperature for fusion of the fiber ends. Capillary tube 10 is preferably of a high temperature material i.e. ceramic. It has an inner diameter dimensioned to flushly receive within it the optical fibers to be joined. Thus the outer diameter of the optical fiber should be only marginally less than the inner diameter of the capillary tube. The capillary tube 10 acts as a guide for the two ends of the fibers to be joined.

On each end 12 of capillary tube 10 is secured a metal ferrule 18, the ferrules each having, at their exterior ends 20, a cylindrical pocket 22 extending centrally towards the other end 24 as illustrated. Pocket 22 has a constricted bottom 26 opening into, as illustrated, and communicating with, corresponding end 12 of capillary tube 10. Each ferrule 18 thereby makes electrical contact with conducting material 16 on capillary tube 10 and can thus be used as an electrical contact in association with power source 27 and associated circuitry as illustrated in FIG. 2, for supplying power to heater means 14. (Where heater means 14 is made up of elecrodes for generating an electric arc, power source 27 must of course be of high voltage source.) As well, secured within pocket 22 is preferably provided a thermally set sleeve 28, the inner diameter of which is selected to provide a flush fit with the outer diameter of jacket 8 of optical fiber 6.

Extending between ferrules 18 and spaced from capillary tube 10 is a tube 30, preferably of ceramic material within the ends of which are seated ends 24 of ferrules 18 as illustrated. Tube 30 provides a containment chamber 32 about heater 14 and capillary tube 10, which chamber may be evacuated, inert gas filled or air filled as required, during construction of unit 2. In operation, the ends of the fibers which are to be joined are stripped of jacket 8 and cleaved to the correct length. The prepared ends 4 are then pushed into unit 2, one from each end, as far as they will go, ends 4 meeting within capillary tube 10 within the effective heating area of heater 14. With ferrules 18 acting as electrical contacts, current is passed through one of the ferrules along conducting material 16, to heater 14 to cause fusion of the facing, contacting ends 4 of fibers 6. At the same time, ferrules 18 are subject to heating, so that each sleeve 28 becomes bonded to the corresponding fiber jacket 8. (Other means, such as use of an adhesive in pockets 22 of diameter about that of the outer diameter of jacket 8, may be used in place of sleeves 28 to secure jacket 8 in their corresponding pockets 22 of ferrules 18.) When the electrical current and heat are removed, the splice is completed.

Figure 3:
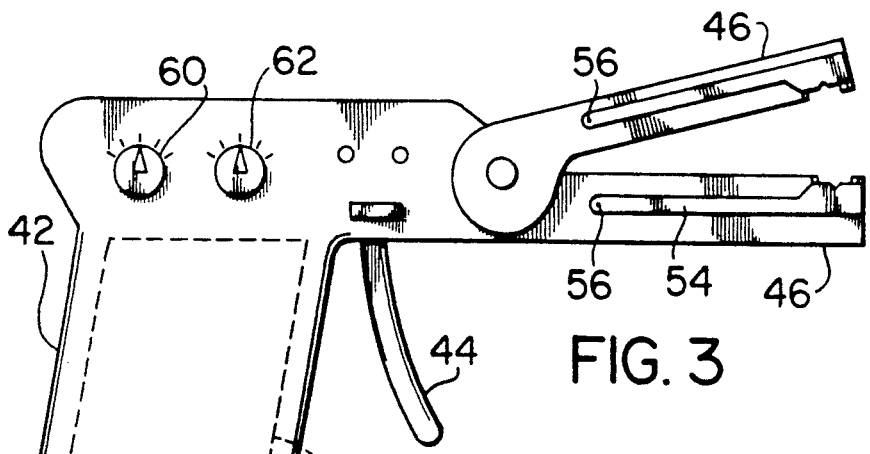
FIG. 3 is a perspective view of a tool for installing the unit of FIGS. 1 and 2.

A tool to accomplish this splicing together of ends 4 of optical fibers 6 is illustrated in FIG. 3. That tool 40 takes the form of a gun having a hand grip 42, trigger 44 and hinged jaws 46 at the "barrel end" of tool 40. Within handle 42 is a quick change battery pack, 48 (preferably re-chargeable). As well, handle 42 contains the necessary control circuitry to carry out the functions of fusing optical fibers 6 and heating ferrules 18 when held in hinged jaws 46. Trigger 44 is arranged to activate the closing of jaw 46 and provide fusion power and heating, as will be described in more detail hereinafter.

Figure 4:
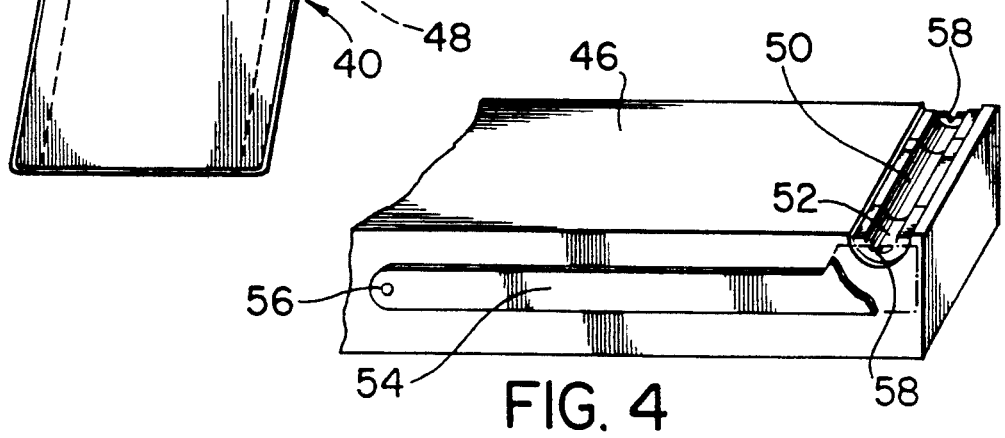
FIG. 4 is a partial perspective view of an end portion of the lower jaw of the tool of FIG. 3.

As can be seen in FIG. 4, a transversely extending groove 50 is provided in jaws 46, which groove is to receive splice unit 2 during the splicing operation. At the outer ends of groove 50 are electrical contacts 52, appropriately connected to battery pack 48 through control circuitry (not illustrated). Depression of trigger 44 activates that circuitry to provide current to the appropriate contact 52, and hence to a corresponding ferrule 18 when splice unit 2 is appropriately positioned within groove 50. As well, contacts 52 are arranged, with respect to the control circuitry of tool 40, to become heated and provide the necessary heat to cause thermosetting of sleeve 28 with respect to its corresponding jacket 8 of optical fiber 6 during the splicing operation. Tool 40 is also provided, at the ends of jaws 46, with fiber gripping and inward pushing arms 54, these arms being pivoted at ends 56 and mechanically associated with jaws 46 so that, upon closing of jaws 46, notches 58 grip corresponding portions of the corresponding jacket 8. As jaws 46 are moved into closed position, pushing arms 54 apply a light (20 micron) compression to the fibers, with their ends 4 in contact within capillary tube 10, for completion of the splicing operation.

In operation, tool 40 is used as follows. Once the fibers have been stripped and cleaved to the correct length and their ends 4 have been pushed into unit 2 until ends 4 are in contact within capillary tube 10, within the vicinity of heater 14, unit 2 is then placed into groove 50 in the open jaw 46 of tool 40, such that ferrules 18 are in contact with corresponding electrical/heater contacts 52. The fuse and heat settings 60 and 62 respectively are adjusted and trigger 44 is depressed. As the trigger 44 travels inwardly towards the fully engaged position, the following sequence of events takes place:

1) Jaws 46 close down over splice unit 2 and fiber push mechanism 54 clamps over the corresponding fiber jacket, on each side of jaws 46.
2) A timed fusion current is turned on, and after a small delay, push mechanism 54 applies a slight (about 20 micron) compression to the two fibers 6
3) The supplementary heater function of contacts 52 is activated, bonding corresponding fiber jackets 8 to sleeves 28 of unit 2.
4) The fusion current is turned off.
5) The heater current is turned off.

Releasing trigger 44 opens the jaws, releasing the finished splice.

The tool 40 thus holds the splice unit and provides the necessary current for fusion of ends 4 of fibers 6. It provides mechanical support to unit 2 during the splicing and acts as a source of electrical power for activating the splice. Tool 40 serves a number of functions including:

1) holding unit 2 during the installation process;
2) manipulating unit 2 into tight spaces;
3) providing a source of necessary electric power for heater 14;

4) providing a means of advancing the fibers together during the fusion process;
5) providing a heat source for bonding the unit 2 on to the fiber jacket, at each end of unit 2;
6) enabling setting of the time for the fusion heating to take place; and
7) providing a means of controlling the heat for jacket bonding.

This tool is compact and simple to operate, requiring a technician to make very few adjustments.

Thus it is apparent that there has been provided a unit and method for splicing together the ends of jacketed optical fibers in accordance with the invention that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A self-contained unit for splicing together the ends of jacketed optical fibers comprising:
   (a) a guide means being a capillary tube having opposite ends into which the ends of optical fibers to be spliced pass until they are in contact in a central portion of the guide means;
   (b) a high temperature electrical heater means proximal to and circumscribing the central portion of the guide means, when activated said heater means to generate sufficient heat to fuse and splice together said contacting fiber ends; and
   (c) securing means mechanically associated with the guide means to secure optical fibers when spliced together.

2. A unit according to claim 1 wherein spaced ferrules are located at the ends of the capillary tube and rigid means extend between the ferrules to secure them in spaced relationship.

3. A unit according to claim 2 wherein pockets are provided in opposite ends of the ferrules within which pockets the jackets of the fibers are to be seated and secured.

4. A unit according to claim 2 wherein electrical circuitry extends between said ferrules and said electrical heater means to pass current to the heater means to cause required fusion of the ends of the fibers whereby the ferrules act as electrical contacts through which electrical power is supplied to said heater.

5. A unit according to claim 4 wherein electrical contact between the electrical heater and the ferrules is provided by means of conducting material deposited on the capillary tube.

6. A unit according to claim 2 wherein said means extending between the ferrules to secure them in spaced relationship comprises a tube of ceramic materials, to a different end of which each of the ferrules is secured.

7. A unit according to claim 6 wherein facing ends of the ferrules are positioned within corresponding end portions of the tube of ceramic material to provide a containment chamber circumscribing central portions of the capillary tube.

8. A unit according to claim 7 wherein said containment chamber is either evacuated, inert gas filled or air filled.

9. A unit according to claim 3 wherein, in each of the pockets of the ferrules is secured a sleeve of thermosetting material.

10. A unit according to claim 9 wherein the sleeves of thermosetting material in the pockets in opposite ends of the ferrules have inner diameters similar to the outer diameters of the corresponding fiber jackets.

11. A unit according to claim 3 wherein the diameter of each of the pockets is about that of the outer diameter of the corresponding fiber jacket.

12. A unit according to claim 7 wherein the outer diameter of the ferrules and outer diameter of the tube of ceramic material are similar.

13. A method of splicing together ends of jacketed optical fibers comprising passing the ends to be joined into a capillary tube into contact in a zone within the capillary tube subject to high temperature heating, the capillary tube extending between spaced ferrules joined by rigid securing means, provided with jackets into which the jackets of the fibers are positioned during the splicing operations, and heating the zone to fuse and splice corresponding ends of the fibers.

14. A method according to claim 13 wherein an electrical heating element is positioned proximal to the heating zone and electric current is passed to the heater element to generate heat to fuse the ends of the fibers.

15. A method according to claim 13 wherein the ferrules are and are simultaneously heated to bond the jackets to thermosetting plastic sleeves positioned in the ferrule pockets.

16. A tool for splicing together the ends of jacketed optical fibers using the unit of claim 2, the tool comprising
   (a) a frame;
   (b) a means associated with the frame for holding the unit in position during the splicing process and releasing it thereafter;
   (c) a means associated with the frame to hold fibers to be spliced, and their jackets, in position during the splicing process and moving them relatively towards each other into contact;
   (d) a power source actuable through switch means to provide current to operate the electrical heater means; and
   (e) control means to co-ordinate the sequencing and actuation of said means and heater.

17. A tool according to claim 16 further comprising heater means actuable to heat the ferrules to bond the jacket to thermal setting plastic sleeves positioned within the ferrule pockets.

18. A tool according to claim 17 wherein the frame is in the form of a hand held gun with hinged jaw means for securing the unit in position and a trigger means for activating the jaw, providing electrical current to the electrical heater and heat to the ferrules.

* * * * *